United States Patent [19]

Heyland et al.

[11] Patent Number: 5,476,773
[45] Date of Patent: Dec. 19, 1995

[54] FLAVORANT COMPOSITION PREPARED BY FERMENTATION

[75] Inventors: Sven Heyland, Weiningen; Thang Ho Dac, Le Mont s/Lausanne; Hugh Hose, Treycovagnes; Robert D. Wood, Lausanne, all of Switzerland

[73] Assignee: Nestec S.A., Vevey, Switzerland

[21] Appl. No.: 281,939

[22] Filed: Jul. 28, 1994

[30] Foreign Application Priority Data

Sep. 21, 1993 [CH] Switzerland ............... 2836/93

[51] Int. Cl.$^6$ ............... C12P 21/04; C12P 21/06
[52] U.S. Cl. ............... 435/68.1; 426/44; 426/46; 426/52; 435/71.2; 435/832; 435/839
[58] Field of Search ............... 435/68.1, 71.2, 435/832, 839; 426/46, 44, 52

[56] References Cited

U.S. PATENT DOCUMENTS

| | | | |
|---|---|---|---|
| 3,767,532 | 10/1973 | Hirose et al. | 435/222 |
| 3,857,966 | 12/1974 | Feldman et al. | |
| 3,912,822 | 10/1975 | Yokotsuka et al. | |
| 3,914,436 | 10/1975 | Nakadai et al. | |
| 4,001,437 | 1/1977 | Jaeggi et al. | |
| 4,022,666 | 5/1977 | Mitsugi et al. | 435/839 |
| 4,110,477 | 8/1978 | Naruse et al. | 426/46 |
| 4,113,892 | 9/1978 | Shimizu et al. | 426/46 |
| 4,466,986 | 8/1984 | Guggenbuehler et al. | |
| 4,882,180 | 11/1980 | Takao et al. | 426/46 |
| 4,919,936 | 4/1990 | Iwanami et al. | 435/939 |
| 5,100,679 | 3/1992 | Delrue | 426/44 |
| 5,130,149 | 7/1992 | Keller et al. | |
| 5,141,756 | 8/1992 | Bajracharya et al. | |
| 5,141,757 | 8/1992 | Ho Dac et al. | |

FOREIGN PATENT DOCUMENTS

| | | |
|---|---|---|
| 0199981A3 | 12/1986 | European Pat. Off. |
| 0320057A2 | 6/1989 | European Pat. Off. |
| 0406598A1 | 1/1991 | European Pat. Off. |

OTHER PUBLICATIONS

Aps Abs (JPO Abs.) Abstract J62–24436 (Oct. 24, 1987) Osawa et al.
American Type Culture Collection Catalogue of Bacteria, Phages and rDNA Vectors, Sixteenth edition, 1985.

*Primary Examiner*—Herbert J. Lilling
*Attorney, Agent, or Firm*—Vogt & O'Donnell

[57] ABSTRACT

A flavorant composition is prepared by inoculating and fermenting a protein-rich material, particularly pulse seeds and in particular, cooked pulse seeds, and then, the fermented material is mixed with a reducing sugar and water, the mixture is heated to obtain a reaction product, and the reaction product is dried.

24 Claims, No Drawings

FLAVORANT COMPOSITION PREPARED BY FERMENTATION

BACKGROUND OF THE INVENTION

This invention relates to a process for the production of a flavouring agent in which a mixture containing a source of free amino acids and at least one reducing sugar is reacted.

A traditional method of preparing a source of free amino acids which lends itself to the production of a flavouring agent by reaction with a reducing sugar, i.e. by Maillard reaction, is based on the hydrolysis with concentrated hydrochloric acid of a material rich in proteins, such as peanut or soya cake for example.

U.S. Pat. No. 4,466,986 (Nestec S. A.) describes a process of this type in which the hydrolyzate is subjected to fractionation in a column of granular active carbon, and by selecting or calibrating the fractions, it is possible to obtain a clear neutral-tasting amino acid source which does not mask the aroma subsequently released during the Maillard reaction.

However, in more recent processes, it has been preferred to use a milder form of hydrolysis than the traditional hydrolysis with concentrated hydrochloric acid, more particularly enzymatic hydrolysis. One problem to be solved with processes such as these lies in the bitterness or the particular taste which the hydrolyzates can have.

U.S. Pat. No. 5,141,757 (Nestec S. A.), for example, describes a process for the production of a flavouring agent in which an aqueous suspension of a protein-rich material, such as a pulse flour for example, is hydrolyzed with a protease and then ripened or refined with koji enzymes.

SUMMARY OF THE INVENTION

The problem addressed by the present invention was to provide a new process for the production of a flavouring agent comprising reacting a mixture containing a source of free amino acids obtained by fermentation of a protein-rich material with which it would be possible to obtain a reaction product with an agreeable taste and odour, more particularly a taste free from any bitterness and, preferably, a relatively neutral odour.

To this end, the process according to the invention comprises the steps of fermenting a protein-rich material with a strain of *Bacillus subtilis* or *Bacillus natto*, preparing a mixture containing the fermented material, at least one reducing sugar and water, reacting the mixture by heating and drying the reaction product.

DETAILED DESCRIPTION OF THE INVENTION

To carry out the process according to the invention, the protein-rich material may be selected from a group consisting, for example, of seeds of oil-yielding crops or pulses, cereal gluten, lactic proteins and isolates or concentrates of vegetable or animal proteins.

In one preferred embodiment of the process according to the invention, the protein-rich material consists of cooked pulse seeds, more particularly soya or carob seeds which have optionally been deskinned and/or size-reduced, more particularly ground. The cooked pulse seeds may be prepared by boiling for 40 to 60 minutes or soaking for 20 minutes to 5 hours at 20 to 60° C. and then heating with steam, preferably in an autoclave or in a belt cooker, for 2 to 30 minutes at 120° to 140° C., so that the seeds are not only cooked, but also sterilized for example.

The above-mentioned strain of *Bacillus subtills* or *Bacillus natto* may be a commercial strain, such as can be obtained above all in Japan, or a strain isolated from a commercial product or local cottage-industry product, namely, a dawadawa or an iru from Sub-saharan Africa, or West Africa or a natto from Japan, China, Taiwan or Thailand for example. The strains in question may also be obtained from official collections, such as the American Type Culture Collection (ATCC) in the USA or the Collection Nationale de Cultures de Microorganismes (CNCM) in Europe.

Preferred strains of *B.natto* or *B.subtilis* are those which produce relatively little viscous mucilage while, at the same time, ensuring effective hydrolysis and a high glutamic acid content in the hydrolyzate. This facilitates above all the pumping and transfer of the product during production on an industrial scale.

A culture or leaven of the strains in question may be prepared, for example, by cultivating them under aeration (0.01 to 0.5 vol/vol/min) for 10 hours to 3 days at 35 to 45° C. in an aqueous medium containing 1 to 5% of soya flour, 0.5 to 3% of malt extract and up to 0.6% of yeast extract.

The protein-rich material, preferably in moist and size-reduced form, may be fermented by inoculation with 0.5 to 2.0% by volume of a culture containing $5 \times 10^7$–$10^9$ germs of the particular strain per ml and subsequent fermentation under aeration with moist air, more particularly air moistened to saturated, for 1 to 7 days at 30° to 45° C.

The fermented protein-rich material may have a characteristic odour of natto or dawadawa. Without wishing to be limited by this interpretation, the characteristic odour mentioned may be associated with the presence in the fermented material of such fatty acids as, for example, 2-methyl butanoic acid and 3-methyl butanoic acid which may emanate respectively from the degradation of the amino acids isoleucine and leucine.

The reason for this is that, according to the invention, a very clear correlation has been found between the intensity of the characteristic odour of natto or dawadawa and the total concentration of these two acids in the fermented protein-rich material. Surprisingly, the intensity of this characteristic odour and the concentration of these two acids are greatly reduced (reduction in concentration of approximately 40 to 60%, for example, based on dry matter of the fermented material) during the subsequent steps of the process. However, they can nevertheless remain significant in the end product (total concentration approximately 1600 to 2100 ppm, for example, based on dry matter of the fermented material).

To obtain a fermented material having a relatively neutral odour, which surprisingly differs from the characteristic odour or natto dawadawa and which leads to a reaction product with an agreeable taste, more particularly a meat taste, that is not accompanied by an overly pronounced odour of natto or dawadawa, 0.5 to 5% by weight of carbohydrate, more particularly glucose and/or sucrose, or of a carbohydrate source, more particularly rice flour or barley malt, assimilable by the particular strain may be added to the protein-rich material before fermentation.

This is because it has been found that the concentration of 2-methyl butanoic and 3-methyl butanoic acids in the fermented material can be significantly reduced in this way and, hence, can be reduced to a commensurately greater extent in the end product.

The fermentation process may be carried out, for example, on trays, on a plate drilled with holes or in a commercial apparatus, such as the apparatus known in Japan as a koji machine.

In the preferred embodiment of the process according to the invention where the protein-rich material consists of cooked pulse seeds, more particularly ground soya seeds, the fermented seeds may be suspended in water containing 15 to 19% by weight of sodium chloride before preparing the mixture for the reaction. Under these conditions, the fermented seeds will keep without any danger of the fermentation process continuing uncontrollably and with a reduced risk of contamination by other microorganisms.

The mixture prepared for the above-mentioned reaction is preferably a mixture having a water content of 35 to 55% and containing (in % by weight of dry matter) 24 to 97% of the fermented material, 2 to 40% of sodium chloride, 1 to 4% of added reducing sugar, 0 to 2% of a sulfur-containing substance, 0 to 15% of monosodium glutamate and 0 to 15% of sucrose.

The last four ingredients mentioned above are intended where necessary to provide the flavouring agent according to the invention with the ability to impart a taste reminiscent of meat, an enhanced aroma and/or a rounded aroma. The sulfur-containing substance mentioned may be selected from the group consisting, for example, of cysteine, cystine, methionine, thiamine and mixtures thereof.

The addition of a significant quantity of sodium chloride, so that the mixture contains for example 30 to 40% of sodium chloride, is preferred because, apart from the expected effect on the organoleptic equilibrium which the flavouring agent is able to impart, it also leads to a surprising effect which facilitates drying of the product after the reaction.

The mixture may be reacted by heating for 1 minute to 4 hours at temperatures of 80° to 150° C., the relatively short times corresponding to the relatively high temperatures and vice versa, a temperature of 100° C. maintained for 3 hours, for example, being a set of recommandable intermediate values.

In a preferred embodiment, the mixture is reacted by heating for 1 to 40 minutes at 120° to 150° C. because a surprising effect of chemical and bacteriological sterilization of the reaction product can be simultaneously obtained in this way.

The reaction product is then preferably dried to a residual moisture content of 2% or less.

The reaction and drying steps may be carried out in two separate units, more particularly in an autoclave or in a belt cooker and in a vacuum dryer, after which the compact mass obtained may be broken up and ground, for example in a hammer mill. The reaction and drying steps may also be carried out by extrusion cooking in a twin-screw extruder and the expanded strand obtained may be carefully size-reduced or ground for example.

The flavouring agent obtained by the process according to the invention may be used as such to impart a seasoned flavour, more particularly a taste reminiscent of meat, to a variety of dishes or in combination with other ingredients for the preparation of sauces and soups for example.

EXAMPLES

The process and product according to the invention are illustrated by the following Examples in which percentages are by weight, unless otherwise indicated.

Example 1

To prepare a culture or leaven of *B.natto*, a culture medium containing 4% of non-defatted soya flour, 2% of malt extract, 0.5% of yeast extract and 93.5% of water is prepared, sterilized for 15 minutes at 125° C. and inoculated with 1% of a preculture containing per ml $5.10^8$ germs of a strain of *B.natto* isolated from an artisanal natto from Japan. The whole is then incubated for 24 hours at 40° C. with agitation and aeration at a rate of 0.2 vol of air per vol of medium per minute.

Non-deskinned soya seeds are ground in a hammer mill to a mean particle size of 3.6 mm. The ground soya seeds are soaked in their own volume of water for 30 minutes at 60° C. They are then cooked and sterilized in a belt cooker for 4 minutes at 130° C. and then cooled to 40° C. They are then inoculated by spraying from above at the exit of the belt cooker with 1% by volume of the culture prepared as described above which contains $5 \times 10^8$ *B.natto* germs per ml. The inoculated seeds are then distributed in a koji machine in a layer thickness of 40 cm. They are then left to ferment for 3 days under aeration by passing air at approximately 40° C. moistened to saturation through the layer.

The temperature of the cooked seeds increases from about 45° C. between the fourth and the eighth hour of fermentation. To stop the temperature from rising any further, the passage of air through the layer is increased and maintained at the higher level to the end of the first 24 hours, after which the temperature returns to approximately 41° C. and the initial air flow rate is re-established. During the fermentation process, the dry matter content of the cooked seeds gradually increases from around 50% to around 63.5%.

On completion of fermentation, the fermented cooked seeds have respective contents of 4.3% of total nitrogen, 1.0% of amine nitrogen (i.e. approximately 6.25% of amino acids and/or peptides, including 1.04% of glutamic acid) and 1.04% of reducing sugars which are relatively high and are particularly suitable for the practical application of the present process.

A mixture is prepared which has 36.2% of the fermented seeds, 29.2% of water, 0.9% of xylose, 19.7% of sodium chloride, 0.9% of cysteine, 6.6% of monosodium glutamate and 6.5% of sucrose.

The mixture thus obtained has a water content of 42.76% and contains (in % by weight of dry matter) 39.8% of dry matter of fermented seeds, including 0.65% of reducing sugars, 1.5% of xylose, 34.4% of sodium chloride, 1.5% of cysteine, 11.4% of monosodium glutamate and 11.4% of sucrose.

The mixture is reacted by heating for 3 hours at 100° C. in a double-jacketed tank. It is then dried at 95° C. under a reduced pressure of 15 mbar to a dry matter content of 1.5%, broken up and reduced to powder.

The flavouring agent obtained has a water content of 2% and a total content of 2-methyl butanoic and 3-methyl butanoic acids of 1865 ppm, based on the dry matter weight of the fermented seeds.

To taste the flavouring agent, a quantity of 5 g containing 5 g of added sodium chloride is dissolved in 1 litre of boiling water. The water thus flavoured has an agreeable taste free from any bitterness, and is reminiscent of a meat broth enhanced by a characteristic natto odour.

Example 2

The procedure is as described in Example 1, except that the mixture is reacted in an autoclave for 40 minutes at 120° C.

The flavouring agent obtained is capable of imparting the same organoleptic properties as the flavouring agent obtained in accordance with Example 1, but has exceptional keeping qualities by virtue of the fact that the product is also chemically and biologically sterilized under these reaction conditions.

Example 3

The procedure is as described in Example 1, except that the mixture is inoculated with a culture of *B.subtilis* isolated from a dawadawa from the local cottage industry of Sub-saharan Africa.

When tasted under the same conditions as in Example 1, the flavouring agent obtained has an agreeable taste free from any bitterness, and is reminiscent of a meat broth enhanced by a characteristic dawadawa taste.

Example 4

Seeds are cooked and fermented in the same way as described in Example 1.

A mixture is prepared which has 44% of the fermented seeds, 40% of water and 16% of sodium chloride. The resulting suspension may be kept for one week at ambient temperature without undergoing any significant bacteriological or organoleptic modification.

A mixture is prepared which has 78.8% of the aqueous suspension, 0.8% of xylose, 6.8% of sodium chloride, 0.8% of cysteine, 6.4% of monosodium glutamate and 6.4% of sucrose. The mixture obtained has a water content of 44.33% and a dry matter composition similar to that of the mixture obtained in accordance with Example 1.

The mixture is reacted in an autoclave for 40 minutes at 120° C, dried and reduced to powder.

When tasted under the same conditions as in Example 1, the flavouring agent obtained has an agreeable taste free from any bitterness, and is reminiscent of meat broth enhanced by a characteristic natto odour.

Example 5

The procedure is as described in Example 4, except that a small percentage of carbohydrate or of an an assimilable carbohydrate source (1% of glucose) is added to the seeds before fermentation to weaken the characteristic natto odour of the end product.

Table I below shows the total 2 - and 3 -methyl butanoic acid content and the intensity of the natto odour exhibited by the flavouring agents obtained in accordance with Examples 4 and 5 in addition to their meat taste and enables them to be compared.

TABLE I

| Ex. No. | Carbohydrate added | 2- and 3-Methyl butanoic acids (ppm) | Natto odour |
| --- | --- | --- | --- |
| 4 | | 1865 | Characteristic |
| 5 | 1% Glucose | 746 | Greatly reduced |

The results set out in the Table show that it is possible by the process according to the invention to produce a flavouring agent capable of imparting an agreeable taste, more particularly a meat taste, free from any bitterness and, if desired, enhanced to an adjustable extent by the odour of natto or dawadawa.

We claim:

1. A process for preparing a flavorant composition comprising:
   inoculating and fermenting a protein-rich material with a strain of a bacteria selected from the group consisting of Bacillus subtilis and Bacillus natto to obtain a fermented material;
   mixing the fermented material with water and at least one reducing sugar to obtain a mixture;
   heating the mixture for from 1 minute to 4 hours at a temperature of from 80° C. to 150° C. to obtain a reaction product; and
   drying the reaction product.

2. A process according to claim 1 wherein the protein-rich material is selected from the group consisting of pulse seeds, cereal gluten, lactic proteins, animal protein isolates and concentrates, and vegetable protein isolates and concentrates.

3. A process according to claim 1 wherein the protein-rich material is pulse seeds.

4. A process according to claim 1 wherein the protein-rich material is cooked pulse seeds.

5. A process according to claim 3 or 4 wherein the pulse seeds are selected from the group consisting of soya seeds and carob seeds.

6. A process according to claim 3 or 4 wherein the pulse seeds are ground seeds.

7. A process according to claim 1 wherein the mixture is heated for from 1 minute to 40 minutes at a temperature of from 120° C. to 150° C.

8. A process according to claim 1 further comprising, prior to inoculating and fermenting the protein-rich material, adding a flour material selected from the group consisting of rice flour and barley malt to the protein-rich material and then inoculating and fermenting the protein-rich material and added flour material.

9. A process according to claim 1 further comprising, prior to inoculating and fermenting the protein-rich material, adding from 0.5% to 5% by weight of a carbohydrate to the protein-rich material and then inoculating and fermenting the protein-rich material and added carbohydrate.

10. A process according to claim 9 wherein the carbohydrate is selected from the group consisting of sucrose and glucose and mixtures thereof.

11. A process according to claim 4 further comprising adding sodium chloride to the water so that the water mixed with the fermented material contains the sodium chloride in an amount of from 15% to 19% by weight.

12. A process according to claim 1 further comprising mixing sodium chloride with the fermented material so that the mixture comprises, by weight dry matter, from 35% to 55% water, from 24% to 97% fermented material, from 1% to 4% reducing sugar and from 2% to 40% sodium chloride.

13. A process according to claim 12 further comprising mixing at least one of a sulfur-containing substance, sodium glutamate and sucrose with the fermented material so that when mixed with the fermented material, the mixture comprises, by weight dry matter, the sulfur-containing substance in an amount up to 2%, sodium glutamate in an amount up to 15% and sucrose in an amount up to 15%.

14. A process according to claim 12 further comprising mixing a sulfur-containing substance selected from the group consisting of cysteine, cystine, methionine, thiamine and mixtures thereof with the fermented material so that the mixture comprises, by weight dry matter, the sulfur-containing substance in an amount up to 2%.

15. A process according to claim 1 wherein the protein-rich material is inoculated with the strain in an amount of from 0.5% to 2.0% by volume of a culture containing $5 \times 10^7$ to $5 \times 10^9$ germs of the strain and is fermented for 1 to 7 days at a temperature of from 30° C. to 45° C. under aeration with moist air.

16. A process according to claim 1 wherein the strain is isolated from dawa dawa.

17. A process according to claim 1 wherein the strain is isolated from iru.

18. A process according to claim 3 further comprising boiling the pulse seeds for from 40 minutes to 60 minutes for obtaining cooked seeds and then inoculating and fermenting the cooked seeds.

19. A process according to claim 3 further comprising soaking the pulse seeds for from 20 minutes to 5 hours at from 20° C. to 60° C. for obtaining soaked seeds and then heating the soaked seeds with steam from from 2 minutes to 30 minutes at from 120° C. to 140° C. to obtain cooked seeds and then inoculating and fermenting the cooked seeds.

20. A process according to claim 1 wherein the reaction product is dried to a residual moisture content of 2% or less.

21. A process according to claim 1 wherein the mixture is extrusion-cooked to heat the mixture.

22. The product of the process of claim 1.

23. The product of the process of claim 2.

24. The product of the process of claim 4.

* * * * *

UNITED STATES PATENT AND TRADEMARK OFFICE
CERTIFICATE OF CORRECTION

PATENT NO. : 5,476,773
DATED : December 19, 1995
INVENTOR(S) : Sven HEYLAND, et al.

It is certified that error appears in the above-indentified patent and that said Letters Patent is hereby corrected as shown below:

Column 7, line 3 (line 4 of claim 15), "107 to 5 x 109" should be --$10^7$ to 5 x $10^9$--.

Signed and Sealed this

Nineteenth Day of March, 1996

Attest:

BRUCE LEHMAN

Attesting Officer   Commissioner of Patents and Trademarks